VICTOR A. WILLOUGHBY
GARY I. BLAIR
INVENTORS

ATTORNEY & AGENT

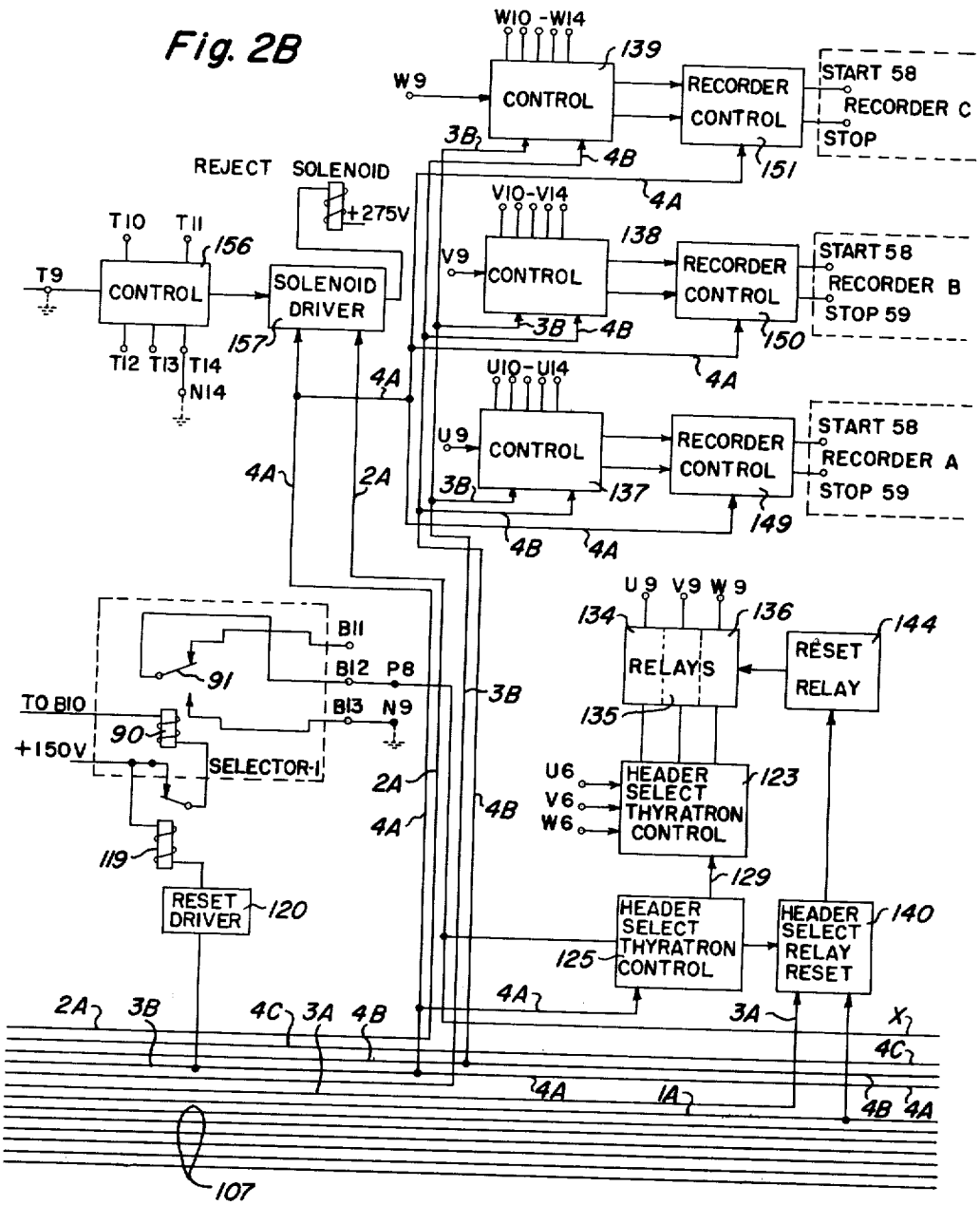

Aug. 4, 1964
V. A. WILLOUGHBY ETAL
3,143,724
CARD-TO-TAPE CONVERTER SELECTOR
Filed May 13, 1960
8 Sheets-Sheet 4
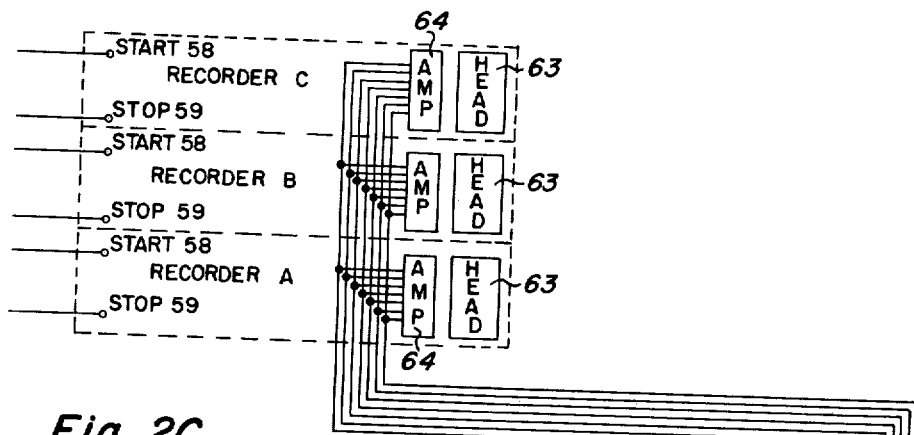
Fig. 2C
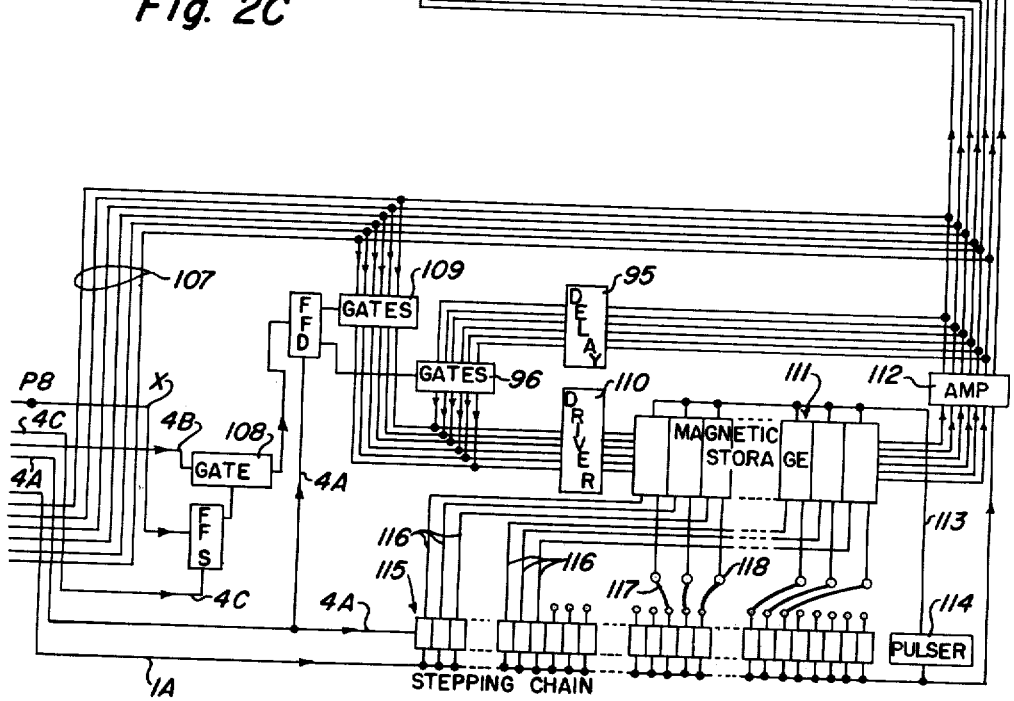
VICTOR A. WILLOUGHBY
GARY I. BLAIR
INVENTORS
BY R. Frank Smith
Lloyd F. Seebach
ATTORNEY & AGENT

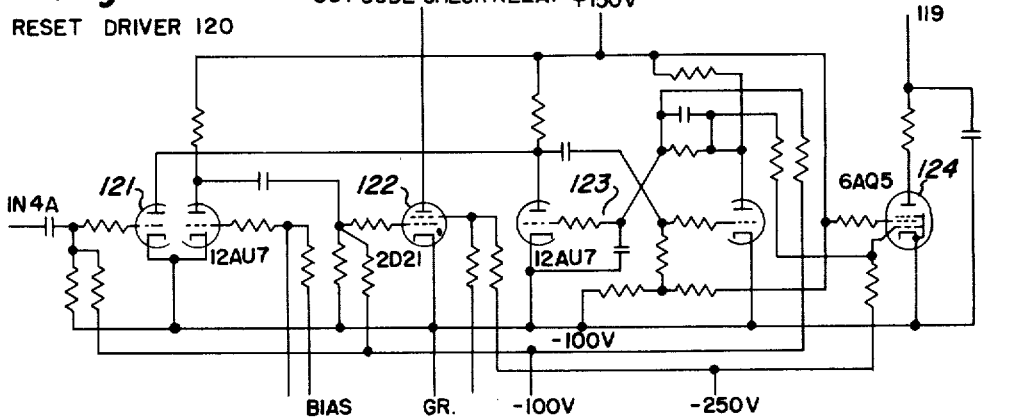
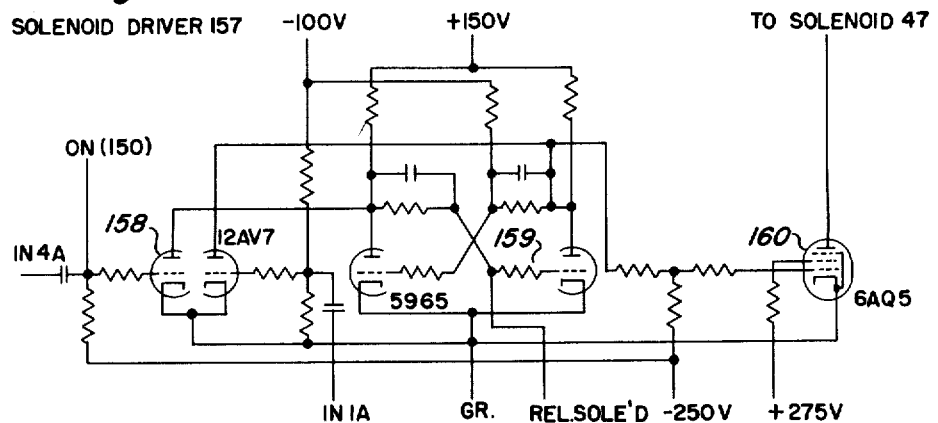
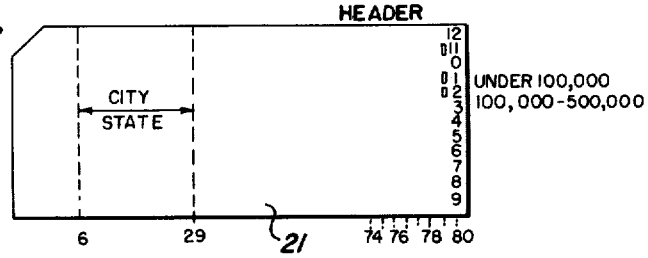
VICTOR A. WILLOUGHBY
GARY I. BLAIR
INVENTORS
ATTORNEY & AGENT

VICTOR A. WILLOUGHBY
GARY I. BLAIR
INVENTORS

ATTORNEY & AGENT

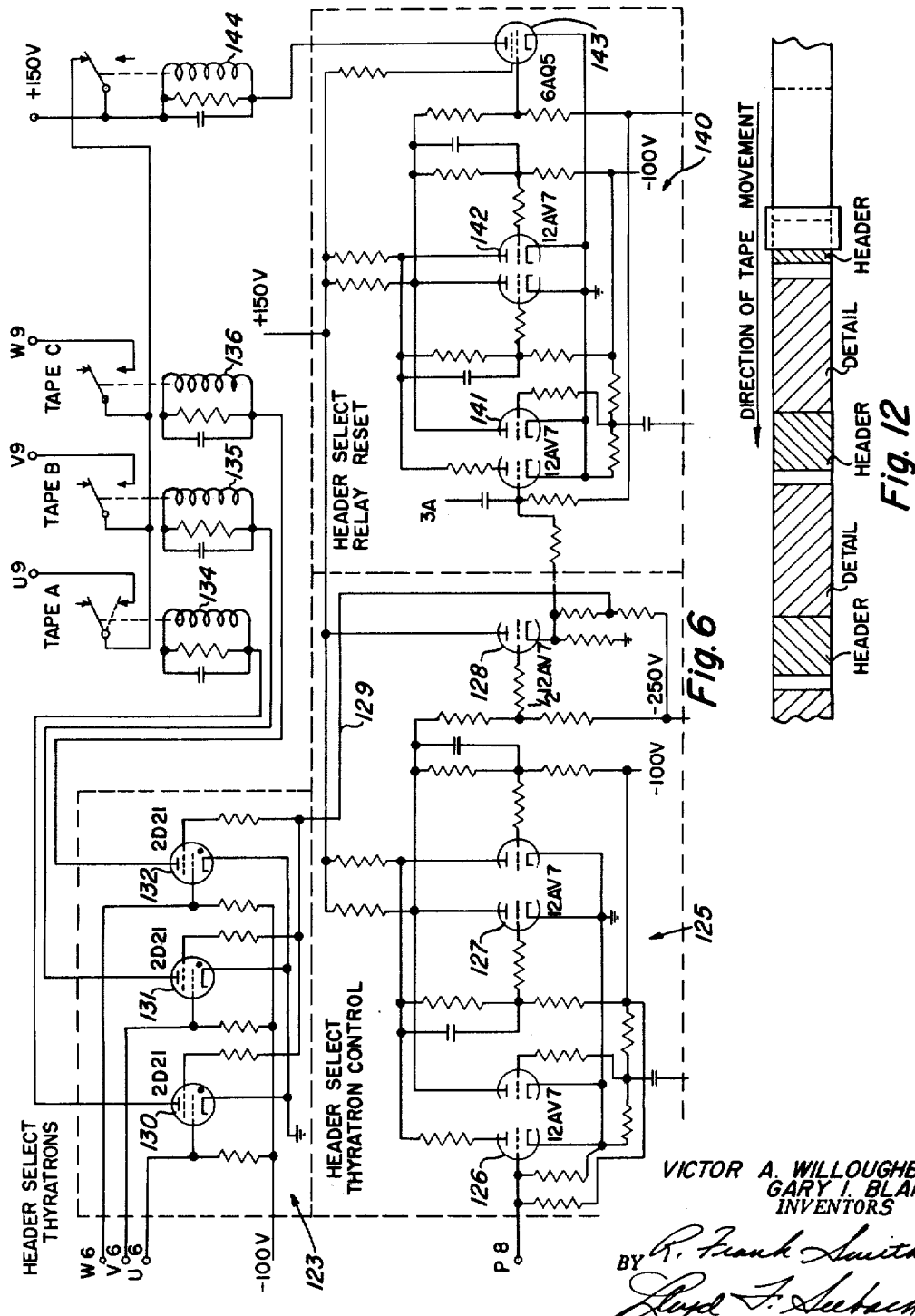

Aug. 4, 1964  V. A. WILLOUGHBY ETAL  3,143,724
CARD-TO-TAPE CONVERTER SELECTOR
Filed May 13, 1960  8 Sheets-Sheet 8

VICTOR A. WILLOUGHBY
GARY I. BLAIR
INVENTORS

BY R. Frank Smith
Lloyd F. Seebach
ATTORNEY & AGENT

United States Patent Office 3,143,724
Patented Aug. 4, 1964

3,143,724
CARD-TO-TAPE CONVERTER SELECTOR
Victor A. Willoughby and Gary I. Blair, Rochester, N.Y., assignors to Eastman Kodak Company, Rochester, N.Y., a corporation of New Jersey
Filed May 13, 1960, Ser. No. 29,066
10 Claims. (Cl. 340—172.5)

This application relates to an improved punched card to magnetic tape converter for selectively recording on one or more magnetic tapes data derived from punched cards fed through the converter, card by card, from a stack of cards, without removing the selected cards from their normal order in the stack, and particularly to such a converter having provisions for combining the data derived from two classes of cards and for selectively recording on one of the tapes the information derived from the cards, the selection being based on data derived from one and/or both classes of cards.

While such a converter obviously is capable of a great variety of uses in many fields, it is of particular value in conjunction with a magazine subscription fulfillment system utilizing punched cards for each subscriber and a printer arranged to print mailing address labels in accordance with the data derived from such cards. In such a system a card is ordinarily punched with the name, address and relevant subscription data for each individual subscriber. Due to the relatively limited number of columns which can be placed on a single card and the need for including as much detail as possible on each card, it is frequently necessary to restrict the number of columns available for the address as well as information which is common to all cards of a group. In such cases all cards for subscribers living in a particular city and state, for example, will be grouped together and a single card will be punched with the city and state data, population data, geographical location data, mailing data, etc., and will be inserted in the card stack or file immediately ahead of the corresponding group of subscriber cards. By this means, data space on each subscriber card is increased and made available for information relating particularly to the individual subscriber.

To distinguish between the two types of cards in the following description, the term "detail" card will be used to identify the individual subscriber card and the term "master" card or "header" card will be used to identify the card bearing the city, state, and other data common to all detail cards of a group.

In U.S. Patents 2,659,652 and Re. 23,713, apparatus is disclosed which is useful in such a subscription fulfillment system and which includes a printer which can be controlled directly by the punched cards to automatically print data derived from the cards onto a series of mailing labels, one for each card. Further, U.S. Patent 2,899,498 discloses such a system wherein the data from a header card can be printed along with that from each of the detail cards associated with that header card. While such a system operates very effectively when it is desired to print mailing labels corresponding to all detail cards, it is subject to certain drawbacks when only certain selected cards are to be used for composing a mailing list. Thus, for example, when it is desired to mail renewal notices to only those subscribers whose subscriptions are about to expire, it is necessary to first sort out the desired cards from the complete stack or file and, after having run them through the printer, reinsert them in their proper positions in the stack. Such a procedure is not only time consuming but also has the disadvantage that the master stack of cards will, during a relatively large percentage of the time, be incomplete due to the fact that certain of the cards will have been sorted out for the purpose of making special lists.

In order to overcome the disadvantages of the above-mentioned arrangement and at the same time increase the selectivity of the system, the card-to-tape converter of this invention utilizes a selection station and a reading station, these two stations being spaced along the path of card movement with the selection station arranged ahead of the reading station. At the selection station, a number of photocells can be arranged with respect to any of the columns of a card for the purpose of selection, one of these photocells always being arranged with respect to the column which designates a header card. By means of plugboard connections, data on the header card and/or on the detail card can be utilized to select the tape or tapes on which the data is to be recorded. When the cards reach the reading station, the data is read and recorded on the preselected tape or tapes. When a header card reaches the reading station, the data read therefrom will be fed to a storage or memory unit where it will be retained until the next header card is recognized at the selection station. The header card data is read out of the storage unit to the appropriate recorder or recorders once for each related detail card so that the header card data will be recorded on the tape or tapes immediately adjacent the data from each of its associated detail cards, the header card data being re-entered into the storage unit for readout with the succeeding detail card.

The above operation of the card-to-tape converter can be best understood by application to a specific example as set forth hereinafter. If it is assumed that a mailing list is set up as follows, the advantages encompassed in the present invention will be readily apparent to those skilled in the art. Heretofore, as shown in the above U.S. Patent 2,899,498, the header card contained only the data denoting the city and state, all other required or necessary data being entered on the detail cards. A magazine subscription list is utilized for many other uses aside from the actual mailing of the magazine. As is well-known, many magazine publishing houses print more than one magazine and it has been found that this information can be encoded on the subscriber's detail card, thereby using a single card for one or more magazines which are mailed to the same subscriber. The subscriber's expiration date, which may be the same or different for each magazine, the subscriber's occupation, the subscriber's marital status, and other information can also be encoded on the detail card for use in mailing expiration notices and promotion or advertising matter to the subscriber. In addition, information pertinent to a group of subscribers or to mailing of the magazines of a group may be of interest, for example, population of the town as under 100,000, over 500,000, etc.; the general classification of the town as farming, mining, etc.; the zone or distance from the mailing point; all of which permit selection of a group of cards. Since such information is common to all cards of a group, this information can be encoded on the header card and selection can then be based on the header card of the group, in conjunction with data encoded on the detail cards. As an example, to provide two mailing lists based on towns having populations of under 100,000, and over 100,000 but less than 500,000, the header card would be encoded with this information to make the selection of the tape unit on which the detail cards are to be recorded. If the list is also to be selective on the bases of gender and marital status, this selection would be derived from each detail card of a group and used to control operation of the tape selected by the header card.

The various information is, of course, encoded in the same columns of each header or detail card as the case may be. For the above example, the selector photocells are arranged with respect to the appropriate columns for deriving the selection information from the header and detail cards as they are moved through the selection station. By making proper plugboard connections, the selection data is utilized to control the recording of the data on the tape. When a header card is sensed, the storage unit is conditioned to receive the new data as well as to condition the proper recorder, provided data is sensed on the header card corresponding to the predetermined selection data. If the header card contains the required selection data, then at the reading station the city and state data is sensed and fed into the storage unit. As each detail card is moved through the selection station, the photocells aligned with the detail card selection columns will derive signals therefrom which, in turn, will condition the tape recorder designated by the header card to record the name and address and any other data as the same detail card passes the reading station. If the detail card does not contain the required selection data, then the name and address data is not recorded but the card retains its proper place in the group of cards. On the basis of the above example, which is understood to be hypothetical for illustrating the versatility of the invention, two tapes will be obtained, one having the name, address (detail), and city and state (header) of each married man in towns under 100,000 and the second having the name, address (detail) and city and state (header) of each married man in towns of 100,000–500,000. It is to be understood, of course, that other data in addition to the name, address, city, and state can be recorded on the tape in accordance with the column connections made via the plugboard.

The primary object of the invention is, therefore, to provide a card-to-tape converter which increases the selectivity factor of a punched card mailing system.

Another object of the invention is to provide a card-to-tape converter which permits selection of the cards in a group from which data is to be derived for recording to be based on the header card, the detail cards and the header and detail cards.

Still another object of the invention is to provide a card-to-tape converter in which data appearing on the header and detail cards of a group will be recorded in suitable multi-digit code or any one or more of a plurality of magnetic tapes.

Yet another object of the invention is to provide a card-to-tape converter in which data derived from the header card and detail cards of a group is recorded selectively on any one or more of a plurality of magnetic tapes as controlled by data in predetermined columns of the header card and/or detail cards so that only the groups of cards and cards in the group having the selected data will be recorded on a particular tape and/or tapes.

And yet another object of the invention is to provide a card-to-tape converter in which provision is made for ejecting certain cards in a group which are no longer to be retained in the group.

These and other objects and advantages of the invention will be apparent to those skilled in the art from the following description when read in conjunction with the accompanying drawings.

Reference is now made to the accompanying drawings wherein like reference numerals and letters designate like parts and wherein:

FIG. 1 is a diagrammatic view of a card-to-tape converter embodying the present invention;

FIGS. 2A–2C, when combined, are a complete block diagram of the electrical circuitry utilized in the card-to-tape converter;

FIG. 3 is a detail view of a header card for use in connection with the example contained herein;

FIG. 4 is a detail view of a detail card for use in connection with the same example;

FIG. 6 is an electrical schematic of the header card selection circuitry;

FIGS. 7–11 are electrical schematics of various circuits disclosed in the block diagram of FIGS. 2A–2C; and FIG. 12 is a diagrammatic view showing the manner in which the data derived from the cards will be recorded on a typical tape.

Figure 1:
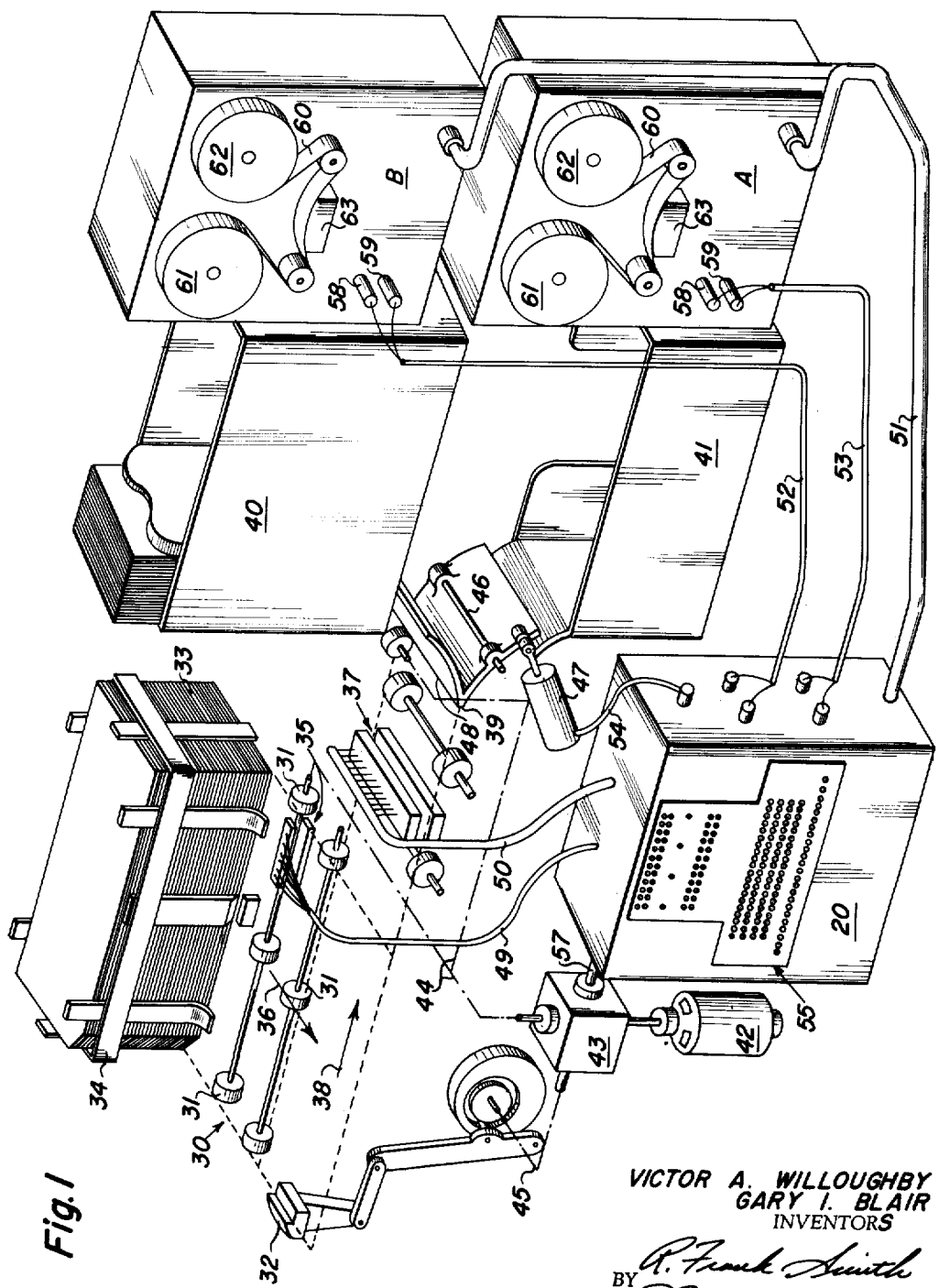

The general arrangement of the card-to-tape converter is shown in somewhat diagrammatic form in FIG. 1. As illustrated therein it includes a suitable card feeding mechanism 30 which may be similar to that shown in detail in U.S. Patent 2,848,535. Mechanism 30 includes suitable feed rollers 31 and reciprocating pushers 32 (only certain ones of which are shown for purposes of illustration) for cyclically feeding cards in stack 33, one by one, from a supply hopper 34, past a code sensing station 35 as indicated by arrow 36, then endwise past a card reading station 37 as indicated by arrow 38, and either over a deflector 39 to a restacking hopper 40 or beneath the deflector to a reject hopper 41. The rollers and pushers are driven by a motor 42 through a suitable transmission 43 and shafting diagrammatically indicated by the dash-dot lines 44 and 45. Conventional control circuits (not shown) for motor 42 will, of course, be provided as is usual with such card feeding mechanism.

The deflector is pivotally mounted by means of shaft 46 about the axis of which it may be rocked by a reject solenoid 47 between its normal position shown in FIG. 1 wherein cards will be deflected upwardly into the restacking hopper 40, and a reject position wherein its front edge 48 is raised above the plane movement of a card leaving reading station 37 to deflect such card downwardly into reject hopper 41. A suitable spring (not shown), which may be incorporated in the solenoid unit itself tends to urge the deflecter into the normal position shown.

The code sensing and card reading stations 35 and 37 are connected by means of cables 49 and 50 to a data switching, storing, and control unit 20, the output of which serves to control the operation of the tape recorders. In FIG. 1 only two such recorders or tape units are shown whereas three recorders A, B and C are shown in FIG. 2 and on plugboard 55 in FIG. 5, the recorders being of a conventional type commonly used to magnetically record data in a plurality of channels on a tape. Each recorder includes a START terminal 58 and a STOP terminal 59 for controlling the feeding of magnetic tape 60 from a supply reel 61 to a take-up reel 62, and the recording of data thereon by a multiple recording head 63. In the instant case the recorders are of the 7-channel type which record in seven parallel channels on the tape, six of which are used for data and the seventh of which is used for recording sync pulses. As is usual with such recorders, the recorders also include suitable recording amplifiers 64, one associated with each channel of the recording heads 63. Starting of one or more of the recorders is controlled by the application of a positive pulse to the appropriate START terminal 58 whereas a negative pulse applied to the appropriate STOP terminal 59 will stop the recorder or recorders. The recorders will continue to operate after having once been started by a pulse applied to the START terminals 58 until a subsequent pulse is applied to the STOP terminal 59. The recorders utilized are of the type in which no actual recording will take place unless the recorder is in operation, with the tape 60 moving past the heads 63.

The data to be recorded, and which is derived from the cards as they pass the card reading station 37 is fed to the recorders from unit 20 through cable 51. The control unit 20 serves to control the starting and stopping of the individual recorders in accordance with the code sensed as the cards pass selection station 35, by means of cables 52 and 53. Reject solenoid 47 is also controlled from the unit 20 to which it is connected by cable 54.

Figure 5:
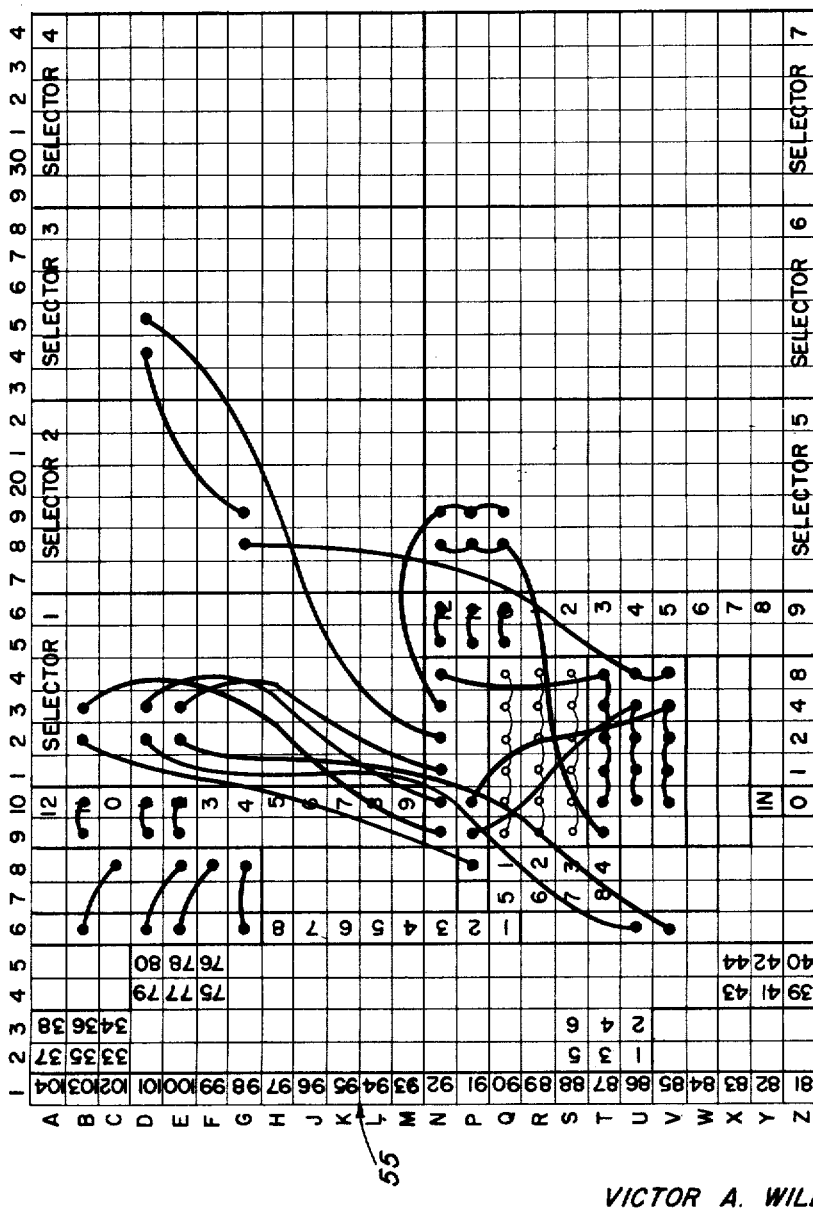
FIG. 5 is a detail view of the plugboard and shows the connections made for the example described herein.

The control unit 20 includes a plugboard indicated by 55 in FIG. 1 and shown in detail in FIG. 5, the function and operation of which will later become apparent. Synchronization of the various switching and control functions of control unit 20 with the feeding of the cards is obtained by means of a suitable synchronizing shaft 57 connecting synchronizing means in the unit 20 to the card feed transmission 43.

As previously mentioned, the operation of the recorders and the routing of the data thereto is controlled automatically in response to the sensing of identifying code punchings on the individual cards 21 and 22, see FIGS. 3 and 4. Any desired number of card columns in any location on the card can, of course, be used for such code designations but, to avoid unnecessary confusion, it will be assumed that all code designations will appear in one or more adjacent columns on both the detail and header cards. Furthermore, in order to simplify the explanation and without in any sense intending to thereby limit the invention, the example set forth above will be used to describe the invention with the data located in one or more of the selection columns, which will be assumed to be the 74th through the 80th columns.

In practice a more complicated multiple-digit coding can be employed without in any way departing from the principle of operation of the invention. Decoding matrices which will sense and decode such multiple-digit codes are well known in the tabulating art and could obviously be substituted for the decoding arrangement to be described herebelow by anyone skilled in the art.

Thus, the header or master card 21, see FIG. 3, which as previously described, has punched therein the city and state information, will each bear a distinctive code symbol, which will be assumed to be in this case a hole in the "11" position in the 80th column. It will also be assumed that each population classification is encoded in the 80th column by a hole in one of the 1–9 positions; for example, under 1000,000 is designated by a hole in the "1" position, 100,000–500,000 by a hole in the "2" position, etc. Other data pertinent to a group of cards can be punched in the 79th column of the header card. The data field in which the city and state is encoded on these master cards will be assumed to be located in columns 6 through 29. It will further be assumed that the code punchings for the data pertinent to each detail card 22, see FIG. 4, on which selection can be based will be located in the 74th–78th columns and that the subscription data and the remaining portion of the subscriber's address will appear in the first seventy-three columns. For purposes of explanation of the operation of the unit, it will be assumed that any detail card having a "1" hole in its 78th column designates a male subscriber, any detail card having a "4" hole in its 77th column designates the subscriber is married, and any detail card having a "12," "11" or "0" hole in its 75th column is to be ejected from the stack. The stacked cards 33 are placed in the feeding hopper 34 face down and with the "12" edge or top of the card leading.

Thus, the cards will pass through the reading station 37 with their 80th column leading and, as will later appear, the data will therefore be recorded on the tapes reversed from its normal order. However when, as is contemplated, the tape is subsequently used to feed the data to label printing equipment, the tape can be run in the reverse direction (without any need for a separate rewind operation) and the data will be fed to the printer in its normal order (first column, first).

The cards themselves will normally be arranged in a predetermined order. For example, in a subscription fulfillment system they would ordinarily be arranged in the master file in alphabetical order by city and state and subscriber's name, with a header card 21 bearing the city and state data immediately ahead of the detail cards 22 of all subscribers living in that city and state.

Figure 2A:
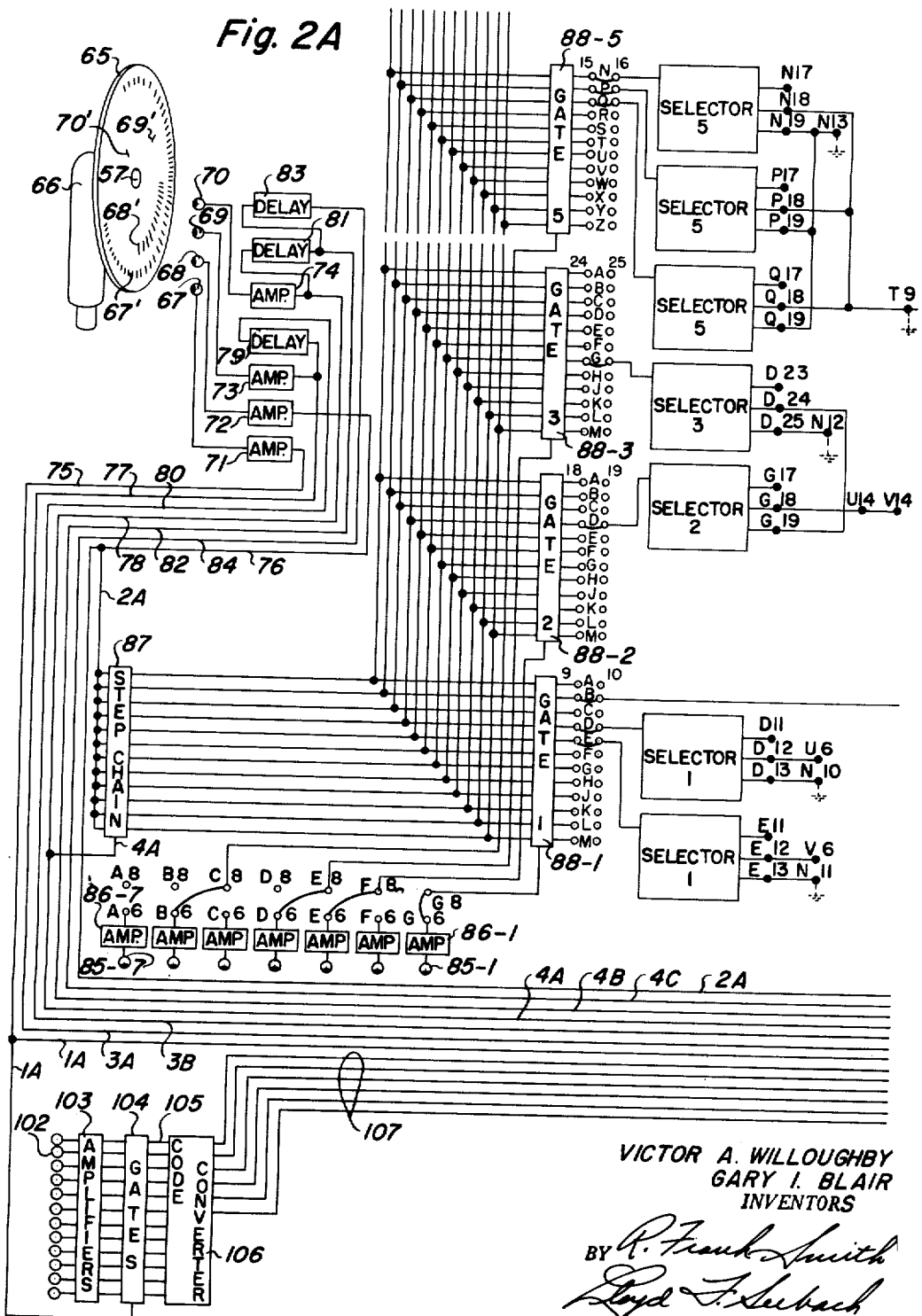

With reference to FIG. 2A, the synchronizing means incorporated in unit 20 comprises a timing disk 65 which is continuously driven at a constant speed of rotation by shaft 57 so that it makes one complete revolution per card cycle. This disk is interposed between a suitable light source 66 and four photocells 67, 68, 69, and 70, respectively, which are arranged at different radial distances from the axis of the disk. Suitable timing marks are provided on the disk between the light source and each of the photocells so that each time a mark is swept between the light source 66 and one of the cells a timing pulse will appear at the output of the associated photocell amplifier 71, 72, 73 or 74. The card feed mechanism moves the cards past the reading station 37 with approximately half a card spacing between successive cards, so that a card cycle is the equivalent of 120 columns passing the reading station. The outermost row of timing marks 67' comprises one hundred and four uniformly spaced marks, the last eighty of which are synchronized with the passage of the eighty card columns of a card moving past the reading station 37. The pulses generated by these marks 67' and appearing on output line 75 of amplifier 71 will be herein termed the column sync pulses 1A. The second row of timing marks 68' associated with photocell 68 comprises twelve marks which are synchronized with the movement of the digit positions in a given column past the selection station 35. The pulses generated by these marks 68' and appearing on output line 76 of amplifier 72 will be herein termed the digit sync or select pulses 2A. The third row comprises a single mark 69' associated with photocell 69 and so located with respect to the other marks so as to produce a first control pulse 3A on line 77 at the output of its associated amplifier 73. The fourth row comprises a single timing mark 70' associated with photocell 70 and so located with respect to the marks in the other rows as to produce a second control pulse 4A on line 78 at the output of its associated amplifier 74 shortly after the last column (which will actually be column 1) of a card leaves reading station 37. For purposes that will be hereafter made clear, the output of amplifier 73 is also applied to the input of a first delay amplifier 79 so that a short time following pulse 3A a second pulse 3B will be generated on the output lead 80 from delay amplifier 79. The second control pulse 4A is also utilized to generate a control pulse 4B by applying pulse 4A to the input of another delay amplifier 81 and appears on the output line 82. Pulse 4B is, in turn, applied to delay amplifier 83 to generate a third control pulse 4C which will appear on line 84. The spacing between these control pulses 4A, 4B and 4C represents but a minor portion of the period between the end of the last pulse of one card cycle and the first column pulse of the next card cycle.

In the arrangement chosen for purposes of description, the selection station 35 includes a group of selection photocells 85 (seven being shown in FIG. 2A) which are suitably supported for positioning over the path of movement of the card and with respect to any selected group of columns. For the example given above, these cells 85 are arranged over the 74th–80th columns of the cards passing through this station. It is to be understood that photocells 85-3—85-7 can be arranged with respect to any of the 78 columns in accordance with location of the selection data on the detail cards whereas photocells 85-1 and 85-2 will be fixed because the selection data on the header card will always be encoded in the same columns, namely the 79th and 80th columns. As disclosed in U.S. Patent 2,848,-

535, a source of light (not shown) is positioned beneath the path of travel of the cards at the selection station 35 so that each time a perforation in the card in any of these columns passes beneath the corresponding photocell 85, the sudden increase in light falling on the cell will cause an output pulse to be generated at the output of the associated preamplifier 86. Outputs of the amplifiers 86–1—86–7 are applied to terminals on plugboard 55.

Figure 7:
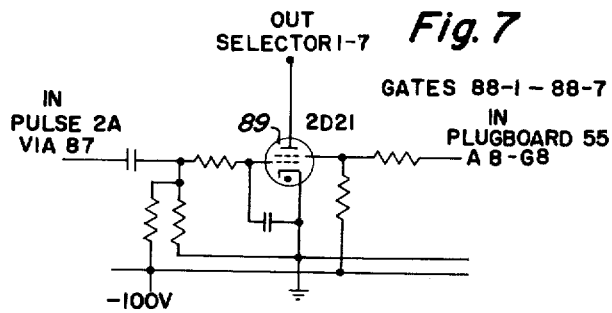

A conventional electronic stepping chain 87 is arranged to be stepped along, stage by stage, in response to the twelve periodic pulses 2A appearing on line 76, the arrangement being such that as each stage is triggered in squence a corresponding pulse will be generated at the output of that stage and will be applied simultaneously to the inputs of gates 88 corresponding to that particular digit position. Each of gates 88–1—88–7 comprises twelve thyratrons 89, see FIG. 7, one thyratron being associated with each possible code position in a column. A pulse 2A cannot, however, pass through any one of these thyratrons unless at the same instant, the particular thyratron is being held open by a gating pulse from the associated photocell preamplifier 86 due to passage of a hole beneath the corresponding photocell 85. Thus, if a "4" hole is present in the 77th column, for example, the pulses 2A derived from the first six stages of stepping chain 87 (corresponding to digit positions "12," "X," "0," "1," "2," and "3") will not be permitted to pass through their respective thyratrons 89, whereas the pulse 2A obtained from the seventh stage of 87 will coincide in time with the pulse obtained from photocell 85–4 due to sensing of the hole or perforation and will appear at the plugboard terminal G24 for the corresponding digit position. Thus, the cells 85 and the gates 88 together with the stepping chain 87 serve as a means for sensing and decoding the particular code designation on each card as it transverses the selection station, and at the same time, as will be described hereinafter, also serve as the selecting means for determining the cards to be selected for recording.

Before proceeding further with the description it is believed the invention will best be understood by a detailed description of the plugboard 55 and its relation to the circuitry for selecting the header and detail cards to be recorded on the tape or tapes. Plugboard 55 comprises a number of sections which are interconnected with the circuits disclosed in FIGS. 2A–2C. Columns A1–A5 through Z1–Z5 are associated with the header card columns and the order in which information derived from the header card is stored in the memory storage unit. A6–G6 are the terminals to which the outputs from amplifiers 86–1 through 86–7 are connected. A8 through G8 are terminals associated with the selector #1–#7 sections on the plugboard. A9 and 10 through M9 and 10 and N15 and 16 through Z15 and 16 are the terminals to which connections are made for determining the hole positions to be decoded by each selector. T9 through T14 are terminals to which connections are made for operating the reject solenoid 47. The control circuits for tape recording units A, B, and C are connected to terminals U9–U14, V9–V14, and W9–W14, respectively, in a manner which will be described hereinafter. P8 is the terminal to which a connection is made for selection and identification of a header card. N and P9–14 are common ground input connections.

For the example cited above the following connections are made to the plugboard for connecting the circuits in their proper order to obtain selection and recording on the basis of the example. With particular reference to FIG. 5, it has been assumed that the information to be derived from header card 21 for storage and recording with each selected detail card 22 is arranged in columns 6–29. These columns S3, R2, R3 . . . F2, F3 and E2 will therefore be connected to Z1–A1, respectively. These same connections can be made to connect the columns in any other order as determined by the arrangement of the information on the card and the desired arrangement of the same information when recorded. With reference to FIGS. 2A–2C and FIG. 5, the output line from amplifier 86–1 for identifying a header card is connected to terminal G6 and this terminal is connected on the plugboard to G8 to associate this output with gate 88–1. Since this column, which is the 80th column, is the one in which a header card is identified by a hole in the "11" position and selection is also to be made on the basis of holes in the "1" or "2" positions for recording by tape unit A or B, these connections are made between B9 and B10, D9, and D10 and E9 and E10. Since the selection of a header card is connected to selector #1, the outputs from the respective thyratrons 89 must be connected to the proper terminals of the selector decoding relays. In FIG. 2B such a relay 90 is disclosed in detail and comprises a double-pole double-throw switch 91 which has its contacts connected to B11, B12, and B13. Each of selectors #1–#7 are provided with 12 such relays. By this arrangement, a number of hole positions can be plugged into each selector section of plugboard 55.

With reference to FIGS. 2B and 10, relays 90 in each of selectors #1–#7 are reset by relay 119 in the reset driver circuit 120 shown in detail in FIG. 10. This circuit comprises a gated inverter 121, a thyratron 122, a bistable multivibrator 123 and a power amplifier 124 for operating the reset relay 119. The pulse 4A through inverter 121 switches multivibrator 123 which, in turn, causes amplifier 124 to conduct, thereby energizing relay 119 to cause relays 90 to become deenergized. A signal to the other side of inverter 121 turns the amplifier 124 off so as to permit relays 90 to be energized by the next card moved through station 35.

Since there are three code positions to be identified in the 80th column, B12 on the plugboard is connected to P8 and this position which is identified by an "11" hole indicates a header card. B13 is then connected to one of the common ground inputs such as N9. D12 is connected to U6 for conditioning tape unit A as will be described hereinafter. E12 is connected to V6 for conditioning tape unit B. D13 and E13 are connected to ground terminals N10 and N11. By these connections a header card moving through selection station 35 will be identified as a header card by the hole in the "11" position and with a hole in the "1" position will condition tape unit A and when a hole appears in the "2" position, tape unit B will then be conditioned as described more fully hereinafter.

For the selection based on the detail cards, the output of amplifier 86–3 is connected to E6 and E6 is, in turn, connected to F8 which is associated with selector #2 on the plugboard. In the same manner, the output from amplifier 86–4 is connected to D6 which through E8 connects the output to selector #3. Since the selection is to be based on the holes appearing in both the "1" and "4" positions of columns 78 and 77, D24 is connected to G19 and G18 is connected to U14 which is also jumpered to V14. D25 is connected to common ground input N12. With these connections tape unit A or tape unit B will be operated depending on which of the two tape units has been conditioned by the "1" or "2" hole in the 80th column. For reasons which follow, U10–U13 and V10–V13 are interconnected with U13 and V13 connected to common ground inputs P9 and P10, respectively.

In the problem set forth above, detail cards having a hole in the "12," "11," or "0" position are to be rejected and for this selection the output of amplifier 86–6 is connected to B6 which in turn is connected to C8 for decoding by selector #5. For the condition stated, N15, P15, and Q15 are connected respectively to N16, P16, and Q16. In selector #16. In selector #5, N18 is connected to P18 and P18 to Q18 which, in turn, in connected to T9 in the Reject section of the plugboard. N19 is connected to the common ground input N13 and to P19 which, in turn, is connected to Q19. T10–T14 are interconnected with T14 connected to common ground input N14. With these connections a hole in any one of the three positions ("12," "11" or "0") will cause the reject solenoid 47 to be operated so the card will be deflected into the reject hopper 41. It is to be understood that each of selectors 1– 7 include 12 relays, any one of which can be associated with any code position in a column.

With reference to FIGS. 2A and 2B, a signal from a card denoting that it is a header card will appear at B10 which will cause the corresponding relay 90 to operate and places the terminal P8 to ground through N9. The terminal P8, see FIG. 6, is connected to a thyratron control circuit 125 which includes an inverter control circuit 126 and a flip-flop circuit 127 and a cathode follower 128. The signal at P8 triggers inverter 126 which in turn triggers flip-flop 127 to operate cathode follower 128 which gives a control voltage. This control voltage is applied via line 129 to the grids of thyratrons 130, 131, and 132 in the header select thyratron circuit 123. If the header card has a hole in the "1" position, a signal will be presented at U6 from amplifier 86–1 which with the control voltage will condition thyratron 130. With both grids of the thyratron now in the conduction range, the thyratron will fire and energize relay 134 to move its contact to the other position in which a connection is made to U9. Since U9 is associated with the tape unit A this terminal is also connected to ground and to the respective terminal of control circuit 137. The header select thyratron circuit 125 will operate only with the sensing of a header card. The header relay reset circuit 140 comprises an inverter 141, a flip-flop 142 and relay operator 143. This circuit uses the pulse 3A in conjunction with the control voltage from cathode follower 128 to energize relay 144 which causes relays 134, 135, and/or 136 to be deenergized thereby returning the contacts to their normal position. The reset relay 144 returns to normal before the grids of the thyratron 130, 131, and/or 132 go below cut-off so the thyratrons again conduct to close their respective relays. The purpose of the reset relay 144 is to deenergize any of the relays 134–136 which were closed by the previous header card. Since the thyratron control circuit 125 operates only in conjunction with a header card, any thyratron 130, 131, 132 which fires remains continuously in a conducting state regardless of what may appear at the grids and holds the respective relays closed during the scanning of an entire group of detail cards. With any one of relays 134, 135, and 136 closed, the respective tape unit is conditioned for operation upon sensing of the required detail cards.

Figure 8:
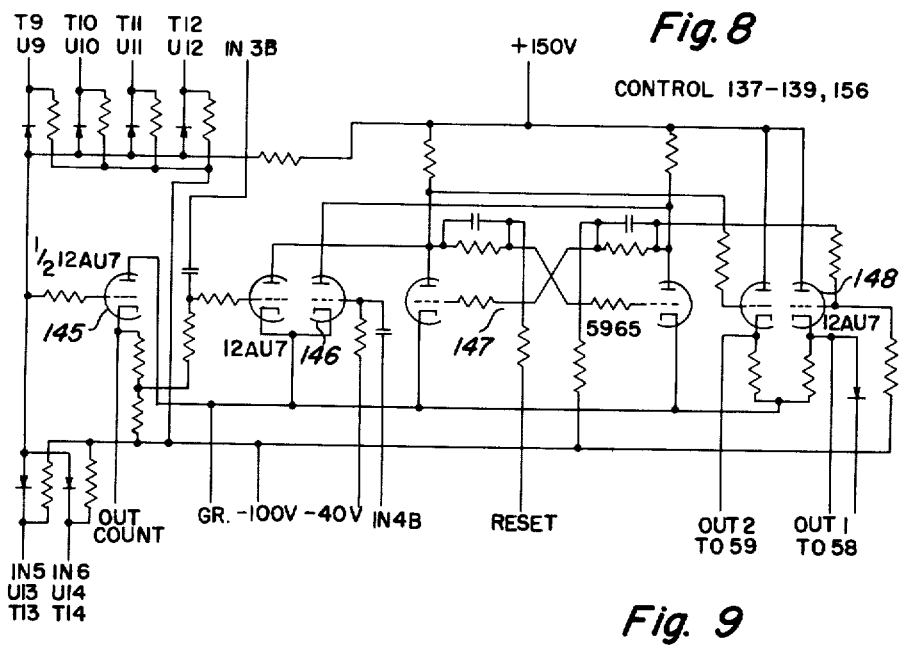
Figure 9:
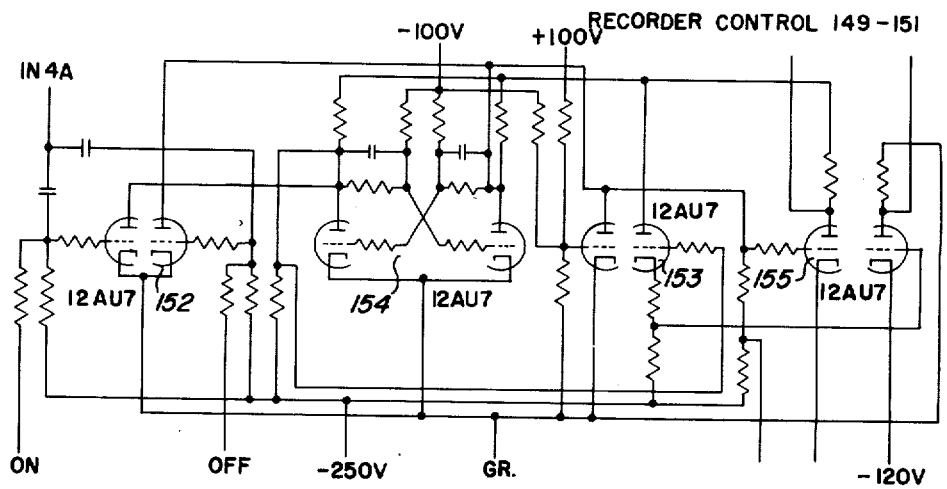

Control circuits 137–139 are shown in detail in FIG. 8. Each of these circuits includes a gate 145, an inverter 146, a bistable multivibrator 147 and a cathode follower 148. Gate 145 has six inputs which must be connected to ground in order to obtain an output upon receiving the pulse 3B. With reference to FIGS. 2B and 8, it will be noted that control circuit 137 has five terminals which are connected to U10–U14 and a sixth terminal connected to U9. From FIG. 5 it will be noted that terminal U9 is connected to the section of the plugboard 55 associated with tape A and U10–U13 are connected to common input ground terminal P9. With the energization of relay 134, U9 is placed to ground and upon sensing both the "1" and "4" holes in columns 78 and 77, respectively, U14 is also placed at ground. When this condition exists and upon receipt of a pulse 3B, gate 145 conditions inverter 146 which, in turn, switches multivibrator 147 to provide a positive output signal to recorder control circuit 149, upon receipt of pulse 4B by inverter 146, a negative pulse is transmitted to circuit 149. This recorder control circuit 149 is shown in FIG. 9 and comprises two gated inverters 152 and 153, a bistable multivibrator circuit 154 and a cathode follower 155. Upon receipt of a positive signal from control circuit 137 and pulse 4A, multivibrator 154 is switched and a positive pulse is transmitted to the start contact 158 of tape unit A. The pulse 4A with a negative pulse applied to this circuit from control circuit 137 results in a negative signal being transmitted to stop contact 59 of tape A. By this means the proper tape unit is rendered operative or shut off by each detail card in accordance with the conditions of the six connections made to control circuit 137. As shown in FIG. 2B, a recorder control circuit 150 and 151 is associated with each of tape units B and C.

When a detail card is sensed in station 35 having a "12," "11," or "0" hole in the 75th column, its associated relay in the selector circuit connects the contact to T9 in the Reject section of plugboard 55. Since the other five inputs of control circuit 156 are at ground (T10–T14 via N14), the sensing of such a detail card places the 6th terminal T9 at ground and a positive signal is applied to solenoid driver circuit 157, as described above. This circuit 157 is shown in detail in FIG. 11 and comprises a gated inverter 158, a multivibrator 159, and a relay operator 160. With the signal derived from control circuit 156 and pulse 4A, relay operator 160 is caused to conduct and results in reject solenoid 47 being energized to move deflector plate 39 into a position which the detail card, after leaving the reading station 37, is directed into reject hopper 41. The pulse 1A causes the multivibrator 159 to reset and solenoid 47 is deenergized to permit deflector 39 to return to its normal position in which it directs the cards into magazine 40.

The reading station 37 includes twelve photocells 102 similar to photocells 85, one associated with and responsive to holes in each digit position as the cards move past the station. The output of each of the photocells 102 is applied through suitable preamplifiers 103 to the input of an associated gating amplifier, one for each digit position, and all of which are designated by the reference numeral 104. The gating amplifiers 104 are controlled by the column sync pulses 1A appearing on line 75 so that whenever a hole is sensed by one of the photocells 102 at the same time that a pulse 1A is present on the line 75, a pulse will appear at the output of the associated gate and will be applied as at 105 to the corresponding input of a code converter 106 which converts the 12-digit code utilized on the cards to a 6-digit code suitable for recording. A suitable code converter utilizing a plurality of ordinary diodes is shown in U.S. Patent 2,912,500. The 6-digit coded pulses appearing at the outputs 107 of the code converter as each column passes the reading station are applied, in parallel, to the recording input terminals of the recorders A, B, and C so that if either or any combination of these recorders are in operating condition at the time, the coded information will be recorded by the heads 63 in the appropriate channels on the magnetic tape or tapes.

So far as the above-described apparatus is concerned, it will therefore be able to record selectively one or more or all cards of a group to reject certain cards from a group, or to pass the cards of a group through the apparatus without recording any cards. There will be a space between recordings of successive detail cards equal to roughly forty columns. The last twenty-four columns of this inter-card space is utilized according to the present invention for recording information from the last preceding header card which has passed through the apparatus.

Whenever a header card passes the selection station 35, a pulse will appear at the P8 position on plugboard 55. This pulse is applied to thyratron control circuit 125 as well as to the input of flip-flop FFS so as to turn the latter from its normally OFF to its ON condition, see FIG. 2C. As a result, the associate gate 108 will be turned ON or opened so that when the pulse 4B of the next card cycle appears on line 82 this pulse may pass through gate 108 to energize or turn ON a data-controlling flip-flop FFD. Whenever flip-flop FFD is in its ON condition, gates 109 will be open so that information appearing at the output of the code converter may pass through these gates 109 to suitable driver amplifiers 110 and thence to the input of a data storage unit 111 which includes a 24 column, 6-channel magnetic storage matrix, details of which are shown in U.S. Patent 2,912,500. For the present consideration, suffice it to say that the storage unit 111 is arranged to store, column by column, the data read from a header card as it traverses the reading station and to thereafter read out this information and apply it through isolating amplifiers 112 to the recorders A, B, and/or C during the 24-column interval immediately preceding the recording of data from each following detail card associated with that header card.

The magnetic storage or memory device 111 referred to above comprises a plurality of magnetic storage cores arranged in twenty-four columns and with six cores in each column, one corresponding to each of the six digit code positions. Each core is provided with a read-in winding, a read-out winding, and an output winding. The read-in windings corresponding to a particular digit are all connected in parallel to the corresponding input terminal for that particular code digit position. The other sides of the input windings of the six cores for each column are connected through suitable isolating diodes to a common lead which is connected directly to the anode of an associated read-in thyratron, one such read-in thyratron being provided for each column. The grids of the read-in thyratrons are connected as shown to individual plugboard terminals on plugboard 55. The read-out windings associated with the cores of each column are connected in series with one another and, through an isolating diode, to the anode of a read-out thyratron. The other ends of the series of read-out windings for all columns are connected by means of a line 113 to the output of a pulser 114, see FIG. 2C, which is adapted to generate a positive pulse of predetermined duration in response to each of the pulses 1A.

The column-by-column triggering of the read-in and read-out thyratrons is controlled by a 104-stage stepping chain 115 which is stepped along, stage by stage, in response to the pulses 1A appearing on line 75 and is reset at the start of each card cycle by the pulse 4A. As each stage of the stepping chain 115 is turned ON, a positive triggering pulse appears at its output, these triggering pulses being utilized to control the firing of the memory control thyratrons. The first twenty-four stages of the counting chain serve to sequentially control the read-out thyratrons to which they are connected by leads 116. The remaining 80 stages of the stepping chain 115 have their individual outputs connected to suitable plugboard terminals any of which may be connected as by plug wires 117 to the read-in plugboard terminals associated with the read-in thyratrons of the memory unit. With this arrangement the storage columns may be rendered operative, column by column, twice during any card cycle, once for the read-out of information in synchronism with the first twenty-four column sync pulses 1A and again upon the firing of the read-in thyratrons, when those stages of the stepping chain 115 which are connected thereto by plug wires 117 are actuated. It was earlier assumed that the desired data to be obtained from the header card was to appear in columns 6 through 29 and FIG. 5 therefore shows these particular stages of the counting chain 115 connected to the read-in terminals 118 of the magnetic storage unit 111. The output windings for a particular digit position in each column of the storage device 111 are connected in parallel through suitable isolating diodes to the corresponding output terminals.

The memory unit operates as follows to store and read-out the data applied to its input terminals from the header cards. If, during the interval while the read-in thyratron of any particular column is biased to operative condition by the triggering pulse from its associated stage of the stepping chain 115, a positive pulse derived from the data on the card appears at any input terminal the thyratron will fire, and current will be permitted to flow through the corresponding input winding and diode for that particular column, magnetizing the associated core. While the thyratron will be extinguished as soon as the input pulse has decayed, the core will remain magnetized thereby effectively storing that particular bit of information.

However, when the read-out thyratron for that particular column is later rendered operative by its associated stage of the stepping chain 115, the read-out pulse from pulser 114 will cause that read-out thyratron to fire and current to flow through all six read-out windings for that column. The direction of winding is such that this produces a sudden reversal of the magnetism in any core having data stored therein, thereby inducing an output pulse in the output winding for that core, which pulse is of proper polarity to pass through its associated diode to the corresponding output terminal. The magnetic characteristics of the cores are such that only when a core has been previously magnetized by an input pulse, will there appear an output pulse at the corresponding output terminal in response to a read-out pulse.

Since read-out destroys the magnetic condition corresponding to the storage of information in a core, provision must be made to re-store this same information in the core for use in succeeding cycles. To this end, the output pulses from the memory unit are applied to a six-channel delay amplifier 95. The resulting pulses at the output of delay amplifier 95 will appear slightly after the original output pulses have decayed but before the decay of the read-out pulse from pulser 114. These delayed pulses are applied through gates 96 (which will be open so long as flip-flop FFD is in its normal or OFF condition) to driver amplifiers 110 and thence to the memory input terminals. A diode is connected between the anodes of the read-in and read-out thyratrons for each column so that these delayed pulses appearing at the input terminals can now pass through the corresponding read-in windings and diodes to the read-out thyratron which will still be held conducting by the read-out pulse from pulser 114. Immediately thereafter, the read-out pulse will decay, deenergizing the read-out windings. However, the appropriate ones of the input windings will continue to pass current until the decay of the delayed pulses, so that these latter pulses will once again cause magnetization of the corresponding cores, restoring them to the condition which existed prior to read-out. This read-out and immediate restoring of the data in the memory will proceed, column by column, as the stepping chain 115 steps along, stage by stage. Thus, the data derived from a header card will be effectively maintained in the storage unit 111 until the gates 96 are shut signalling the arrival of a new header card. When this occurs the feedback circuit through delay amplifier 95 will be rendered inoperative so that read-out will clear the memory in preparation for the storing of data from the new header card.

Overall operation of the card-to-tape converter will best be understood by following the sequence of operation for a series of cards passing therethrough. It will be assumed that the first card is a header card having a hole in the "11" and "1" positions of the 80th column, the next two cards are detail cards, the first of which has a hole in the "1" position of the 78th column and in the "4" position of the 77th column for recording by recorder A, and the second has no holes in the 74–78th columns, that the fourth card is also a detail card which is to be ejected from the stack having a hole in the "12," "11" or "0" position of the 75th column, that the fifth card is another header card with a hole in the "11" and "2" positions of the 80th column, the sixth card is a detail card which has a hole in the "1" and "4" positions of the 78th and 77th columns, respectively, for recording by recorder B, while the seventh card is a header card with a hole in only the "11" position of the 80th column and whose detail cards will therefore not be recorded. For ease of explanation a card cycle will be considered to start with the generation of the first control pulse by timing mark 70' and its associated photocell 70. The first control pulse 4A, appearing on line 78, will reset stepping chains 87 and 115 to their normal or starting condition and will likewise reset flip-flop FFD, which controls the data switching gates 109 and 96, to its normal or OFF condition if it is not already in that condition. In addition, pulse 4A causes relay reset driver 120 to deenergize all of relays 90, causes recorder controls 149–151 to stop Tapes A, B, and/or C, if in operation, and resets header select thyratron control 125 and solenoid driver 157. Shortly after this, pulse 4B will be generated by delay amplifier 81 and will be applied through line 82 to reset control circuits 137–139 to their normal or OFF condition. It will be assumed that flip-flop FFS is already in its OFF or reset condition and that gate 108 will be biased to its closed or inoperative condition. Therefore, the pulse 4B will be unable to pass through gate 108 to energize flip-flop FFD. The third pulse 4C, appearing on line 84, would serve to reset flip-flop FFS were it not already in its OFF condition.

While this series of pulses is being generated, the first card, which, being a header card, has a hole in its "11" position in the 80th column, will be approaching selection station 35. Simultaneously with the passage of the "12" position of the card past selection station 35 the first of the twelve digit sync pulses 2A will be generated by photocell 68 in cooperation with timing marks 68'. The first of these pulses will cause an output pulse to appear on the output side of the first stage of stepping chain 87 which will be applied to gates 88–1 and 88–7 for the corresponding "12" position. However, since it has been assumed that no hole appears in the card in the "12" position in either the 79th or 80th column of the header card, gates 88–1—88–7 will be closed at this time and no pulse will appear on the corresponding terminals of plugboard 55. At the generation of the second pulse 2A, however, the pulse from the second stage of stepping chain 87 will coincide with the pulse derived from photocell 85–1 as it senses the "11" hole in the 80th column of the master or header card. As a result, a pulse will appear at the plugboard terminal B9 and will be applied through B10 to energize the associated relay 90, thereby connecting B12 via B13 to ground at N9 and turning on flip-flop 126 in circuit 125 to operate cathode follower 128 to give a control voltage, as well as flip-flop FFS to open gate 108, which will remain open so long as flip-flop FFS remains in its ON condition. When the photocell detects the hole in the "1" position of the 80th column with the fourth pulse 2A on line 76, gate 88–1 will open and a pulse will appear at D9–D10 to operate the associated relay 90. U6 on plugboard 55 is then placed at ground through D12, D13, and N10. This renders thyratron 130 conductive to energize relay 134 to place U9 at ground and with U10–U13 already at ground five of the six terminals of control 137 are then at ground. As the card continues to advance past the selection station, digit-position by digit-position, the remaining gates 88–1—88–7 will remain closed since there are no other punches in this particular column of a master card.

Meanwhile a series of column sync pulses 1A is being generated by photocell 67 in cooperation with the associated timing marks 67'. These pulses 1A are applied to gates 104 to open these gates briefly, once for each pulse, and also to the memory stepping chain 115 to cause the latter to step along, stage by stage. The preamplifiers 86–1—86–7 and 103 associated respectively with the photocells 85–1—85–7 at selection station 35 and the photocells 102 at the card reading station 37 are of the known type that will produce an output pulse only upon an abrupt increase in light falling thereon, so that no output will appear during the steady state conditions when no card is passing these stations. Therefore, although gates 104 will be briefly opened during each pulse 1A of this first card cycle there will be no pulses appearing thereat from preamplifiers 103.

Stepping of the chain 115 will run the storage unit 111 through a complete read-out cycle but this will likewise have no effect since the recorders are both stationary. No read-in of additional data to the memory unit will occur since, as above mentioned, no data pulses will be generated by the photocells 102 during this cycle.

Shortly before the end of this card cycle, the control pulse 3A will be generated by photocell 69 in conjunction with mark 69'. This pulse causes the reset circuit 140 to energize relay 144 which returns to its normal position before the grid of thyratron 130 can go to a level below cut-off so it remain in conduction and holds relay 134. The pulse 3B occurs a short interval thereafter but has no effect on controls 137–139 because no tape unit was operating. Shortly after the end of this card cycle, pulse 4A indicating the start of the next card cycle will be generated by photocell 70. As before this pulse will reset stepping chains 87 and 115 to prepare them for a new cycle of operation. Flip-flop FFD is already in its reset condition so no action will be produced thereon by this pulse. However, when the pulse 4B is generated on line 80, this pulse will pass through gate 108 (which is still being held open through P8) to energize the switching flip-flop FFD so as to turn it ON. This will cause gates 109 to be biased to their open or conducting condition and will cause gates 96 to be closed or rendered inoperative. Controls 137–139 are still assumed to be in their OFF or reset condition so that pulse 4B will have no effect thereon.

The pulse 4C, appearing on line 84, will reset flip-flop FFS to its OFF condition, which, in turn, will again close gates 108. However, flip-flop FFD has already been turned ON and will remain in this condition until the next pulse 4A on line 78. At a time twenty-four columns before the header card reaches the reading station 37, the first of the pulses 1A will be generated by photocell 67, energizing the first stage of the stepping chain 115 and likewise opening the gates 104 in the card reading circuit. The first twenty-four pulses 1A will run the storage unit through a read-out cycle but, since gates 96 are not closed, the delayed pulses from delay amplifier 95 cannot be re-entered in the memory and any previously stored data will therefore be erased by this read-out operation. Stepping chain 115 will continue to step along, the remaining stages being rendered operative in synchronism with the passage of the corresponding columns of the header card through the card reading station 37. Thus, when the 30th column of the header card reaches the reading station, the data punched therein will cause the generation of an output pulse from one or more of the photocells 102, depending upon the particular holes present in the card in this column, and these pulses will pass through the gates 103 and code converter 106 to the outputs 107 thereof. Since gates 109 are now being held in open or operating condition by flip-flop FFD, the resulting data pulses appearing at the output of the code converter 106 will pass through these gates and drive amplifiers 110 to the corresponding input terminals of storage unit 111. At this same instant the 75th stage of stepping chain 115, corresponding to this card column, will be rendered operative and, through its plug wire 117 will cause firing of the read-in thyratron associated with the first column of the storage unit. Thus the data derived from the 30th column of the card will be read into the appropriate storage cores of the first column of the storage device. This same sequence will repeat, column by column, until the 6th column of the header card has been stored in the 24th column of the memory. The remaining five stages of the stepping chain 115 will be sequenced in turn but will produce no further action.

Meanwhile, the second card, which, as previously described is a detail card having a hole in the "1" and "4"

positions of the 78th and 77th columns, respectively, will be passing through the selection station 35. When these holes pass beneath photocells 85–3 and 85–4, the output pulses will energize their respective relays 90 to connect U14 and V14 to ground at N12 by way of G18, G19, D24 and D25, see FIGS. 2A and 5. With U10 through U13 at ground and U9 having been placed at ground by the header card, control 137 is conditioned with U14 at ground, that is all six inputs are now at ground. Upon receipt of pulse 3B by control 137, a positive pulse is applied to recorder control 149 and upon receipt of the following pulse 4A which is the first control pulse of the next cycle, a pulse is applied to START terminal 58 of recorder A, placing this recorder in operation and rendering it responsive to input signals. This same control pulse will also reset flip-flop FFD, closing gates 109 and reopening gates 96. Shortly thereafter, the pulse 4B will reset control 137 but this will have no effect upon recorder A since the recorders are of the type which, when once started in operation, will continue to operate until a STOP pulse is fed to its STOP terminals 59. The reset drive 120 is responsive to each pulse 4A for resetting solenoids 90 to condition the selectors for each successive card. The pulse 4C will have no effect since flip-flop FFS is already deenergized.

When the first of the timing marks 67' passes opposite photocell 67 the first stage of stepping chain 115 will be energized to apply a read-out triggering pulse to the corresponding first column of the magnetic storage unit 111. As a result, the information stored in this first column will be read out therefrom and pass through amplifier 112 to the recording input terminals of the recorders. Since recorder A is the only one now in operation, the corresponding data pulses will be recorded in the appropriate channels on the magnetic tape. The pulse 1A will also be applied directly through amplifier 112 to the seventh channel of the recorders and will be recorded on this channel in recorder A. While the pulse 1A and the pulses read out from the magnetic storage unit will also be applied to recorders B and C, they will not be recorded thereon since both are inoperative.

During the read-out and recording of information from the storage unit 111, the read-out pulses will, as previously described, also be applied through the feedback circuit including delay amplifiers 95 and gates 96 to the input terminals of the storage unit so that the information being read out from the storage unit will again be stored therein ready for the next cycle. This read-out, recording and re-storing of information from the magnetic storage unit 111 will continue, column by column, until the 24th stage of the stepping chain 115 has been energized. By this time the detail card will have moved to the reading station 37 and at the next pulse 1A the data derived from the 80th column of the detail card will then be passed through gates 104 and code converter 106 to the recorders and will be recorded in the appropriate channels of recorder A. The remaining columns will then be similarly recorded directly from the card, column by column, until the last column (which is column 1 of the card) is reached. The data from the card will be prevented from being read into the memory 111, however, since gates 109 will be closed at this time.

As the second detail card approaches selection station 35, pulse 4A causes recorder control 149 to apply a negative signal to STOP terminal 59 of recorder A, thereby rendering this recorder inoperative after recording of the information stored in memory 111 and of the information derived from the first detail card as it moved through reading station 37. The second detail card has no holes in the 74th–78th columns so it passes through both the selection station and reading station and into hopper 41 without being recorded, the pulses 3A, 3B, 4A, 4B and 4C, having no effect on the various circuits and gates 109 preventing read in of any information into storage unit 111. The pulse 4A does, however, open gates 96 to permit the information stored in memory 111 to be circulated but this is not recorded because none of the readers are operative.

Meanwhile, the third detail card is passing through selection station 35. As previously described this detail card is to be rejected and will be assumed to have a hole in the "12" position of the 75th column. When this hole reaches photocell 85–6 an output pulse will appear at N16 on plugboard 55 via B6, C8, gate 88–5 and N15. This pulse energizes its respective selector relay 90 to place T9 at ground via N18, N19, and N13. With T9–T14 at ground, control 156 transmits a signal to solenoid driver 157 which, upon receipt of the following pulse 4A energizes reject solenoid 47 to position the edge of deflector 39 above the card path for directing this card into reject hopper 41. By this time the leading edge of the preceding detail card will have passed beyond the front edge of deflector 39 and this card will therefore have already been started on its course into storage hopper 40. Thus, while the front edge of deflector 39 will tend to be raised above its normal position, that card will continue on its path into storage hopper 40. However, reject solenoid 47 will remain energized throughout the major portion of this new card cycle.

Returning to the action of the first control pulse following the detection of the card to be rejected, this pulse 4A will likewise reset recorder control 137 to provide a negative pulse to the STOP terminal 59 of recorder A, stopping the operation of the latter. As before, the pulse 4A will also reset stepping chains 87 and 115. While read-out and re-storage of the data from the storage unit 111 will once again occur, the read-out information will not be recorded on any tape since the recorders A, B and C will be in their inoperative condition during this time. Similarly, although data pulses, derived directly from the detail card to be rejected, will appear at the output of the code converter 106, no recording of this data will occur nor will the pulses be able to pass through gates 109 to the magnetic storage unit 111. However, as the cycle continues the leading edge of the card will reach the deflector 39 which will still be in its raised position, and the card will be deflected downwardly by the lower surface of the deflector into reject hopper 41. The duration of the output solenoid driver 157 is such that solenoid 47 will not be deenergized until somewhat after the leading edge of the card to be rejected has reached the deflector 39. At the end of this cycle, the solenoid 47 will, however, be deenergized by pulse 4A in preparation for the next card cycle.

While this reject card is passing through reading station 37, the next card, which has been assumed to be another header card will be traversing the selection station 35 and, when the "11" punch in its 80th column is sensed by the photocell 85–1, flip-flop FFS will once again be turned ON to bias gate 108 to its open condition. This is accomplished by the signal at B10 which causes relay 90 to be energized thereby placing P8 at ground, as described above. The signal derived from the "2" hole appears at E10 and causes its respective relay 90 to place V6 at ground. This places five terminals of control 138 at ground. At the end of this cycle the pulse 4A will again reset the stepping chains. This pulse 4A will however have no effect on recorders A, B or C. The pulse 4B appearing on line 77 will, however, be permitted to pass through gate 108 to turn switching flip-flop FFD ON thereby opening gates 109 and closing gates 96. As the header card approaches the reading station 37 the information stored in storage unit 111 will once again be read out, column by column, under the control of the first twenty-four stages of stepping chain 115. This data will, however, not be recorded by any of the recorders, since they are in inoperative condition at this time. Moreover, since gates 96 in the feedback circuit are now closed, the data read out from the storage unit will not be restored therein, so that the effect of read-out will be to erase the previously stored data and thereby prepare the storage unit for the new header card data. As columns 29 through 6 of the new header card pass the reading station 37, this header card data will be applied through gates 109 to the storage unit and will be stored, column by column, therein.

Meanwhile the next detail card will be passing through selection station 35. This card has a hole in the "1" position and the "4" position of the 78th and 77th columns, respectively, indicating that it is to be recorded on recorder B. When the "1" hole is detected, a signal appears at D19 and with detection of the "4" hole a signal appears at G25 so V14 is at ground via U14, G18, G19, D24, D25 and N12. This places the six inputs V9–V14 of control 138 at ground which with the pulse 3B conditions recorder control 150. Thus, when the next pulse 4A appears on line 78 at the beginning of the next card cycle, recorder B will be placed in operation by the signal applied at START terminal 58. As before, pulse 4B will then reset control 138. Read-out of information from the storage unit and restoring thereof will proceed as before since flip-flop FFD will have been reset to its OFF position, closing gates 109 and opening gates 96 in response to pulse 4A at the beginning of this card cycle. Since recorder B will be operating, the data read out from the storage unit 111 will therefore be recorded on the tape and, as the card passes the reading station 37, the data from this card will similarly be recorded.

The next card is a header card with no holes in either the "1" or "2" position of the 80th column. While the preceding card is being read at the reading station, this card is passing through selection station 35. When the pulse 4A of the next card cycle occurs, recorder B will be stopped. Although P8 will be placed at ground by detection of the "11" hole in the 80th column, no signals will be derived from the "1" or "2" positions to condition any tape unit for operation. As a result, this card and its following detail cards will pass through reading station 37, the information from the header card being read into storage unit 111, the information on the detail cards being read, and the information being read out of storage and recirculated as described above. However, no information will be recorded because all of the recorders A, B, and C are inoperative.

From the above description, it can be already appreciated that the example set forth is merely illustrative of one of the many selections which can be accomplished by the invention. The header card can be used to select the tape without any selection being made by the detail card, the header card can be used in conjunction with the detail card to obtain the desired selection, or the detail card can be used for the desired selection. In any of these cases the proper connections made to plugboard 55 will result in the proper recording of the information on the selected tape or tapes. It can be already appreciated that the selection can be based on intricate and complex conditions and on data which is recorded in any one or in any combination of a plurality of card columns.

While, for purposes of this description, the card-to-tape converter has been illustrated as being used in conjunction with three recorders, it is obvious that any desired number of recorders can be utilized. Any additional recorders would be controlled similarly to recorders A, B, and C and data would likewise be supplied to them as is the case with these recorders. Moreover, while facilities for storing twenty-four columns of data have been specifically disclosed herein, it is believed obvious that any desired number of storage columns could be provided, depending upon the amount of data which it is desired to record from the header cards along with that from the associated detail cards. Obviously, the inter-card spacing may similarly be varied in accordance with the amount of data which it is desired to record from the header cards.

While electronic stepping chains, flip-flops, and gates have been shown and described, equivalent switches or relays could obviously be substituted therefor without invention and without in any way affecting the principle of operation thereof. Other types of synchronizing means, hole sensing means, and data storage devices could also be utilized in place of those specifically described. Many other changes will be apparent to those skilled in the art and could obviously be made without departing from the spirit and scope of the invention as defined by the appended claims.

Having now particularly described our invention, what we desire to secure by Letters Patent of the United States and what we claim is:

1. In a card-to-tape converter for recording data from a series of data-bearing cards including cards of two general classes identified respectively as header cards and detail cards, said cards of each class bearing distinctive code symbols, means for serially sensing the code symbols and data carried by said cards, means for cyclically feeding said cards in spaced relationship to one another past said sensing means, a recorder, a data-storage means, means responsive to and selectively controlled by the sensed code symbols carried by a header card for rendering said storage device operative to store the data sensed by said sensing means during each card cycle wherein a header card traverses said sensing means, means responsive to the sensed code symbols carried by a header card for conditioning said recorder, and means responsive to and selectively controlled by the sensed code symbols carried by a detail card for rendering said recorder operative during a card cycle wherein a detail card traverses said sensing means to record in sequence the data previously stored in said storage device and the data sensed directly from such detail card by said sensing means.

2. In a card-to-tape converter for recording data from a series of data-bearing cards including cards of two general classes identified respectively as header cards and detail cards, said cards of each class bearing distinctive code symbols, means for serially sensing the code symbols and data carried by said cards, means for cyclically feeding said cards in spaced relationship to one another past said sensing means, a recorder, a data-storage means, means responsive to and selectively controlled by the sensed code symbols carried by a header card for rendering said storage device operative to store the data sensed by said sensing means during each card cycle wherein a header card traverses said sensing means, means responsive only to predetermined sensed code symbols carried by a header card for conditioning said recorder, and means responsive to predetermined sensed code symbols carried by a detail card only when said recorder is conditioned for rendering said recorder operative during a card cycle wherein a detail card traverses said sensing means to record in sequence the data previously stored in said storage device and the data sensed directly from such detail card by said sensing means.

3. In a card-to-tape converter for recording data from a series of data-bearing cards, each series including a header card having a selection field in which identification code symbols and selection data are arranged and a data field in which data common to said series of cards is arranged and a plurality of classes of detail cards having predetermined fields in which selection data is arranged and data fields, a selection station, a data-reading station, means for cyclically feeding said cards serially in spaced relationship to one another past said stations, a plurality of recorders, a data storage device, means arranged in said selection station with respect to the selection field of said header cards and predetermined fields of said detail cards for deriving an output in response to the code symbols and data carried by said cards, means arranged in said reading station for deriving an output from the data carried by said cards, means responsive to the output deriving means of said selection station for establishing the selection of a series of cards, of the class of cards in the selected series to be recorded, and of the recorder by which the selected class of cards is to be recorded, means responsive to said selection means, upon detection of a selected header card for conditioning the recorders and for rendering said storage device responsive to the output of said reading station to store the output therefrom as said header card traverses said reading station, and means responsive to said selection means, upon detection of a detail card of the selected class, for rendering the selected recorder operative during a card cycle wherein a detail card traverses said reading station to record in sequence the data previously stored in said storage device and the data derived directly from such detail card.

4. In a card-to-tape converter for recording data from a series of data-bearing cards, each series including a header card having a selection field in which identification code symbols and selection data are arranged and a data field in which the data common to said series of cards are arranged and a plurality of classes of detail cards having predetermined fields in which selection data are arranged and data fields, a selecting station, a data-reading station, means for cyclically feeding said cards serially in spaced relationship to one another past said stations, a plurality of recorders, a data storage device, means arranged in said selecting station with respect to the selection field of said header card and predetermined fields of said detail cards for deriving an output in response to the code symbols and data carried by said cards, means arranged in said data-reading station for deriving an output from the data carried by said cards, means operatively connected to the output deriving means of said selecting station for establishing the selection of a series of cards from the code symbols and selection data on a header card during passage through said selecting station and of the class of detail cards in the selected series to be recorded and the recorder by which the selected class of detail cards is to be recorded from the predetermined field of each detail card during passage through said selecting station, means responsive to said establishing means, upon detection of a selected header card, for conditioning said recorders and rendering said storage device responsive to the output of said data-reading station during passage of said selected header card through said data-reading station, and means responsive to said establishing means upon detection of a detail card of the selected class, for rendering the selected recorder operative during a card cycle wherein such detail card traverses said data-reading station to record in sequence the data previously stored in said storage device and the data derived directly from such detail card.

5. In a card-to-tape converter for recording data from a series of data-bearing cards, each series including a header card having a selection field in which identification code symbols and selection data are arranged and a data field in which the data common to said series of cards are arranged and a plurality of classes of detail cards having predetermined fields in which selection data are arranged and data fields, a selecting station, a data-reading station, means for cyclically feeding said cards serially in spaced relationship to one another past said stations, a data storage device, a plurality of recorders, each of said recorders being connected to the outputs of said data storage device and of said data-reading station, means arranged in said selecting station with respect to the selection field of said header card and predetermined fields of said detail cards for deriving an output in response to the code symbols and data carried by said cards, means arranged in said data-reading station for deriving an output from the data carried by said cards, means operatively connected to the output deriving means of said selecting station for establishing the selection of a series of cards from the code symbols and selection data on a header card during passage through said selecting station and of the class of detail cards in the selected series to be recorded and the recorder by which the selected class of detail cards is to be recorded from the predetermined fields of each detail card during passage through said selecting station, means responsive to said establishing means, upon detection of a header card at said selecting station for connecting the output of said data-reading station to the input of said storage device to store the data derived from the header card as the latter traverses said data-reading station and, upon detection of a selected header card, for conditioning said recorders means for cyclically reading out to said recorders and erasing the output stored in said storage device during a portion of each inter-card interval at said data-reading station, feedback means normally connecting the output of said storage device to the input thereof whereby the output read out and erased therefrom will normally be restored therein, means responsive to said establishing means, upon detection of a header card at said selecting station, for rendering said feed-back means inoperative during said portion of the inter-card interval immediately preceding the entry of a header card into said data-reading station, means responsive to said establishing means, upon detection of each detail card of the selected class, for rendering the selected recorder operative and responsive to the outputs of said storage device and said data-reading station during the passage of such detail cards past said reading station and during the portion of the inter-card interval immediately preceding such passage.

6. In a card-to-tape converter for recording data from only predetermined cards in a series of data-bearing cards, said series of cards including a header card and a plurality of detail cards respectively identified by means of code symbols carried by said cards, a selection station for producing an output in response to said code symbols, a data-reading station for producing an output in response to the data carried by said cards, means for cyclically feeding said cards serially in spaced relation to one another past said stations, a plurality of recorders, a data storage device, means responsive only to code symbols carried by said header card for conditioning said recorders and rendering said storage device responsive to the output of said data-reading station during passage of the header card therethrough, and means responsive to code symbols carried only by predetermined detail cards for rendering at least one of said recorders operative to receive in sequence the stored data during an inter-card interval and the output of said data-reading station during passage of the predetermined detail card therethrough.

7. In a card-to-tape converter for recording data from a series of data-bearing cards, each series including a header card having a selection field in which identification code symbols and selection data are arranged and a data field in which the data common to said series of cards are arranged and a plurality of classes of detail cards having predetermined fields in which selection data are arranged and data fields, a selecting station, a data-reading station, means for cyclically feeding said cards in spaced relationship to one another past said stations, a plurality of recorders, a data storage device, means arranged in said selecting station with respect to the selection field of said header card and said predetermined fields of said detail cards for deriving an output in response to the code symbols and data carried by said cards, means arranged in said data-reading station for deriving an output from the data carried by said cards, selector means responsive to the output of said selecting station for providing a first output identifying a header card, a second output identifying a header card having predetermined selection data, and a third output identifying each detail card of a predetermined class to be recorded, means responsive to said first output for rendering said storage device receptive to the output of said data-reading station during passage of a header card therethrough, control means responsive to said first and second outputs for providing a conditioning output to at least one of said recorders, actuating means responsive to each of said third outputs for rendering only a conditioned recorder operative during a card cycle wherein the detail cards of the predetermined class to be recorded traverse said data-reading station to record in sequence the data previously stored in said storage device and the data derived directly from each such detail card.

8. In a card-to-tape converter, as defined in claim 7, wherein said selector means includes a plurality of relays adapted to be connected to said means arranged in said selecting station and to said storage device, said control means and said actuating means for providing a first output upon identification of a header card, a second output upon identification of a header card having predetermined selection data, and a third output upon identification of each detail card having predetermined selection data.

9. In a card-to-tape converter, as defined in claim 7, wherein said control means includes circuit means connected to a number of relays in accordance with the number of recorders, said circuit means being responsive to said first output for conditioning said relays and to said second output for energizing only the relay associated with the selected recorder whereby such recorder is rendered receptive to said third output.

10. In a card-to-tape converter, as defined in claim 7, wherein each recorder includes a control unit connected to said selector means and said control means, said control unit being responsive to each of said third outputs to render its respective recorder operative only when it has first been conditioned by said control means.

References Cited in the file of this patent

Publication: IBM Reference Manual RAMAC 305, publication No. A26–3502–3, copyright 1958, International Business Machines Corporation, Data Processing Division, 112 East Post Road, White Plains, N.Y.